United States Patent [19]

Benesi

[11] Patent Number: 5,292,434
[45] Date of Patent: Mar. 8, 1994

[54] FILTER APPARATUS AND METHOD USING BELT FILTER MEDIUM

[76] Inventor: Steve C. Benesi, 611 McClay Rd., Novato, Calif. 94947

[21] Appl. No.: 864,524

[22] Filed: Apr. 7, 1992

[51] Int. Cl.⁵ ............................................. B01D 37/00
[52] U.S. Cl. .................... 210/770; 210/227; 210/231; 210/387; 210/791; 100/198
[58] Field of Search ................ 210/770, 767, 791, 87, 210/90, 227, 387, 231, 500.1, 198, 224; 100/198

[56] References Cited

U.S. PATENT DOCUMENTS

| | | | |
|---|---|---|---|
| 3,497,063 | 2/1970 | Hirs | 210/791 |
| 3,499,532 | 3/1970 | Sneider | 210/387 |
| 4,233,157 | 11/1980 | Miller | 210/406 |
| 4,267,060 | 5/1981 | Miller | 210/771 |
| 4,481,108 | 11/1984 | Bratten | 210/137 |
| 4,664,813 | 5/1987 | Schneider | 210/771 |
| 5,059,318 | 10/1991 | Benesi | 210/231 |
| 5,128,029 | 7/1992 | Herrmann | 210/498 |
| 5,133,884 | 7/1992 | Carlsson et al. | 210/791 |
| 5,267,060 | 5/1992 | Miller | 210/406 |

FOREIGN PATENT DOCUMENTS

| | | | |
|---|---|---|---|
| 2131315 | 6/1984 | United Kingdom | 210/791 |
| 2212733 | 1/1987 | United Kingdom | 210/387 |

*Primary Examiner*—Robert A. Dawson
*Assistant Examiner*—Ana M. Fortuna
*Attorney, Agent, or Firm*—George W. Wasson

[57] ABSTRACT

A filter apparatus and method is disclosed for separating solid materials from liquid materials in a slurry fluid. The apparatus includes separable plate members that are pressed against each other to form a filter chamber. The plates have mating surfaces and hollow interior portions that create the chamber. A filter medium is placed between the mating surfaces before the plates are closed. The apparatus includes means for forcing wash fluids, liquids or gasses through the slurry to force the fluids from the slurry and to produce a dry filter cake of the solids. After the filtration has been completed, the plates are separated leaving the filter cake on the filter medium and the filter medium is advanced out of the filter chamber moving a clean filter medium between the open filter plates. Another filter operation them proceeds. The filter medium is cleaned outside of the filter apparatus and can be prepared for reuse.

27 Claims, 6 Drawing Sheets

FILTER APPARATUS AND METHOD USING BELT FILTER MEDIUM

This invention relates to a filter apparatus and a method for operating a filter apparatus and, more particularly, to a filter apparatus for extracting liquids from a wet slurry fluid and for producing a substantially dry filter cake of the solid materials in the slurry. One application of the present invention is in the treatment of slurry fluids having toxic or hazardous materials in either the liquid or solid portion of the slurry fluids and to applications where the liquid portion of the slurry fluid is adaptable to being returned to the system from which the slurry fluid was produced. Another is the removal of fines larger than ½ micron in metal rolling coolant, where the process is continuous instead of "batch" processing of slurry materials.

BACKGROUND OF THE INVENTION

In many industrial processes and in fluid production systems, a slurry of solids suspended in a liquid is produced and it becomes necessary to separate the solids from the liquids so that each material may be treated in ways that will make disposal or use of the treated materials both economical and environmentally effective. In most such processes or systems, the slurry material is fed to a filter apparatus which may take many forms including a belt press, a vacuum filter or a pressure filter. In one form of pressure filtration system a pair of plate members form an internal space chamber separated by a filter media of some form. The plate members are pressed together at mating surfaces with the filter media positioned between the mating surfaces and spread across the interior space separating one plate from the other plate. Slurry materials are fed into one plate and into the chamber while filtrate liquids are taken away from the other plate leaving behind the solids of the slurry accumulated on the filter media. After a sufficient amount of slurry has been treated to accumulate solid materials, the plates are separated and the filter media is replaced and the filtration process is repeated with a clean filter media. The filtrate fluid and solids are then separately used, treated or disposed of in an acceptable manner.

The prior art apparatus of the nature of the above described apparatus have used pressurized gas or vacuum filtration to extract the fluids from the slurry materials. Vacuum-atmosphere pressure differentials have not been effective in creating "dry" solids in the filter cakes they produce and only marginally produce solids in filtrate. Other technologies used in filter apparatus have employed elastomeric diaphragms within the chamber with the diaphragm hydraulically (or pneumatically) actuated to create pressure differentials to squeeze out liquids from solids. Such systems may use compressed air (sometimes called "air-fluff") following the hydraulic diaphragm squeeze to drive out interstitial liquid. Such systems are not as cost effective as pressurized gas filtration because those systems usually require both the air pressure step as well as the diaphragm squeeze to produce dry solids. Further, elastomer diaphragms limit the chamber size and hence limit the solids cake size that can be produced and thus the filter effectiveness. In addition, heat and chemicals may adversely effect elastomer diaphragms. Also, the diaphragm and air squeeze systems add time to the filtration cycles resulting in lower efficiency and lower production rates.

In a prior U.S. Pat. No. 5,059,318, issued Oct. 22, 1991 to the present inventor, there is disclosed a system and apparatus for producing an effective seal between mating filter plates in a manner to substantially reduce or completely eliminate leakage of slurry fluids between the mating filter plates. The present invention relates to such a filter apparatus and discloses the apparatus and method for producing an effective separation of liquids and solids in a slurry material. In the filtration process of the present apparatus and method air, gas and liquid cycles are used in the filtration process to produce an initial high pressure squeeze to clear liquid from solids in the slurry and to drive free interstitial liquid from the solids cake.

SUMMARY OF THE INVENTION

In accord with the present invention, a filter apparatus is formed with a pair of plate members with recessed portions which mate with each other to create a filter chamber between the plate members and a filter medium is positioned between the mating plate members. The peripheral sidewalls of the plate members are adapted with internal grooves for effectively sealing the mating faces of the plates. The filter chamber is adapted to receive the slurry to be filtered and one of the plates is adapted to contain the slurry and to receive controlled fluids or gasses under pressure to force the liquids from the slurry. The other of the plates is adapted with suitable means to support the filter medium and to receive the liquids extracted from the slurry while the solids are retained within the chamber. The plates are moved relative to each other to mate the sidewalls and seal the chamber during the filtering process and, after the filtering has been completed, the plates are separated to permit the solids from the slurry to be removed from the filter chamber. The movement of the solids is accomplished by moving the filter medium from between the separated plate members both for the purpose of removal and for introducing a clean filter medium between the plates. The plates are then ready to be pressed against each other again for a repeat of the slurry filtering process.

The present invention provides for the use of a continuous filter medium belt that can be placed between the plate members, pressed between the plate member sidewalls and retained within the filter chamber, and when the filtering process has been completed the belt can be advanced to remove the filtered solids and to move a clean filter medium between the plates. The filter apparatus provides a means for advancing the filter medium to a cleaning position outside of the chamber and for sensing the positioning of the filter medium to a proper alignment within the chamber in position for the next filtering operation. This results in more area of filter medium being used, less medium travel, and shorter cycle times. Alternatively, the filter medium may be disposable with the filter cake and a new portion of filter medium is advanced into the apparatus with each batch operation.

The filtering of slurry fluids with the present apparatus is performed in an efficient manner by insuring a uniform placement of the slurry fluids within the filter chamber and the timely application of wash fluids (if used) and/or pressurized gasses to the slurry fluids at optimum pressure to force "free liquid" from the slurry fluid and the interstices of the solids in the slurry. "Free liquid" is liquid not adhering to the solid particles of the slurry; this free liquid can be removed by the application of an initial fluid or gas pressure to the slurry in accord with Poiseuille's Law of fluid flow through a permeable solid.

Poiseuille's Law:

A. Velocity of a liquid flowing through a capillary is directly proportional to the pressure of the liquid and the fourth power of the radius of the capillary. (A solids filter cake is non-compressible and the radius of capillaries (interstices) is fixed.)

B. Velocity of a liquid flowing through a capillary is inversely proportional to the viscosity of the liquid and length of the capillary. Poiseulle's Law as applied to the present apparatus indicates that the pressure across a permeable solid is proportional to the liquid velocity through the solid and, as applied to the filtering of slurries, the pressure is directly proportional to the liquid velocity through the retained filter cake. As applied to the present apparatus, an increase in filter cake size (length of capillary) is proportional to increase in pressure across the filter cake for the same dewatering time and viscosity of liquid. Since certain gas or air pressures are standardized, it is beneficial to put these pressures to their most cost effective use in the filtering process. The present apparatus is provided with pressure control and sensing means to permit the application of fluids and/or gasses at the appropriate times plus pressure sensing to control the flow of free liquid from the pressure within the filter chamber; when the free liquids clear the solids of the filter cake, the permeability and gas flow through the solids cake increases and the chamber pressure drops. In accord with the present invention, the timing and pressure of the initial introduction of pressurized fluids or gasses at optimum pressure is controlled to optimize the performance of the filter apparatus in the removal of liquids and the production of a substantially dry filter cake.

With the present apparatus the filtering process can be further enhanced by the application of solvent extraction materials to the slurry materials to remove additional liquids or materials with the liquids or to extracting desired or undesired materials from the filter solids. Because the chamber is adapted for the introduction of liquid and gasses at controlled times, the treatment of slurry filtrate or slurry filter cakes can proceed within the chamber as the filtering process proceeds.

The filter apparatus of the present invention can also be used as a means for recovering and renewing recleanable filter media as is used sometimes with coolant fluids in metal working or rolling operations. In such applications the filter apparatus is not recycled in short batches but is operated to renewed and recycled coolant materials while the cooling fluids of the process are temporarily diverted to another filter means. When the chamber is reformed with a clean filter medium, the filtration process proceeds as a continuous process using the apparatus of the present invention. The apparatus may also be used in these metal working operations for removing and discarding filter media after each cycle.

It is an object of the present invention to provide a filter apparatus that can be efficiently prepared to handle a batch of slurry materials to produce a substantially dry filter cake in a minimum of time and may be recycled to place the filter apparatus in condition to handle another batch of slurry materials in a minimum of time.

A further object in accord with the preceding object is to provide a filter apparatus with associated control means that will permit the optimized application of fluids and gasses to the filter apparatus in optimized timings and pressures.

A further object in accord with the preceding objects is to provide a filter apparatus with a filter medium belt material and construction that will permit the belt to be automatically positioned between mating plates of the apparatus in controllable steps to maximize the use of the filter medium, shorten cycle times, reduce belt travel times, and increase ease of belt tracking.

A further object of the present invention is to provide a filter apparatus formed with mating filter plates and a filter medium between the plates with controlled mating of the plates to substantially reduce or eliminate leakage of slurry materials or slurry filtrate between the mating plates.

These and further objects and features of the present invention will be readily apparent to those skilled in the art from the appended drawings and specification illustrating a preferred embodiment wherein:

DESCRIPTION OF THE PREFERRED EMBODIMENT

Figure 1:
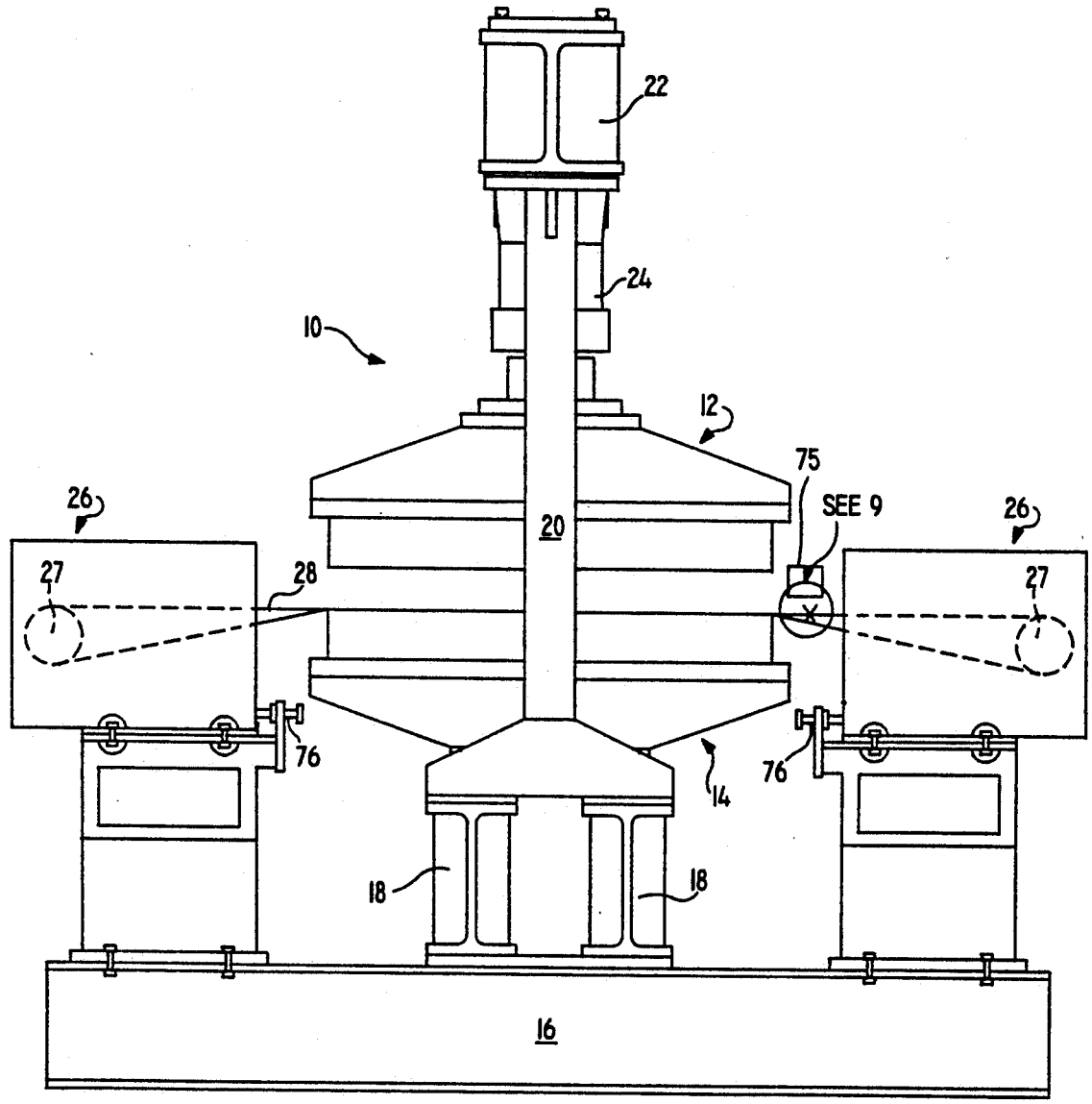
FIG. 1 is an elevational view showing the apparatus of the present invention as assembled open position.

As illustrated in the assembly drawing of FIG. 1, the filter apparatus 10 of the present invention comprises a pair of plate members, an upper plate member 12 and a lower plate member 14, supported on and relatively movable within a support frame assembly comprising a pair of base beams 16, a pair of lower strongback members 18, a pair of spaced tension columns 20, and an upper strongback member 22. As shown more clearly in FIG. 3, the support frame assembly is an assembly of the lower strongback members 18 on the base beams 16 with the spaced tension columns 20 mounted on the lower strongback member 18 and the upper strongback member 22 mounted on the tension columns. The frame assembly has an open interior portion for the support of the lower plate member 14 on the lower strongback 18, with suitable spacing and bracing as will be described more particularly with reference to FIG. 6, and support of the upper plate member 12 suspended from the upper strongback 22, with suitable spacing and bracing as will be more particularly described with reference to FIG. 4, and support of a hydraulic jack mechanism 24 between the upper plate member 12 and the upper strongback 22. As shown in FIG. 1 for a continuous belt operation, at each side of the assembly and mounted on the base beams 16, a pair of filter belt drive and washing assemblies 26 including rollers 27 are mounted for movement and treatment of a filter belt 28; the feed or drive function and the washing function can be performed at either side of the assembly as will be explained later in this specification. It should also be understood that in the alternative form of the apparatus using a disposable medium, there will be a different feed apparatus; however, the medium will be placed in the same location and advanced with each operation of the apparatus.

Figure 2:
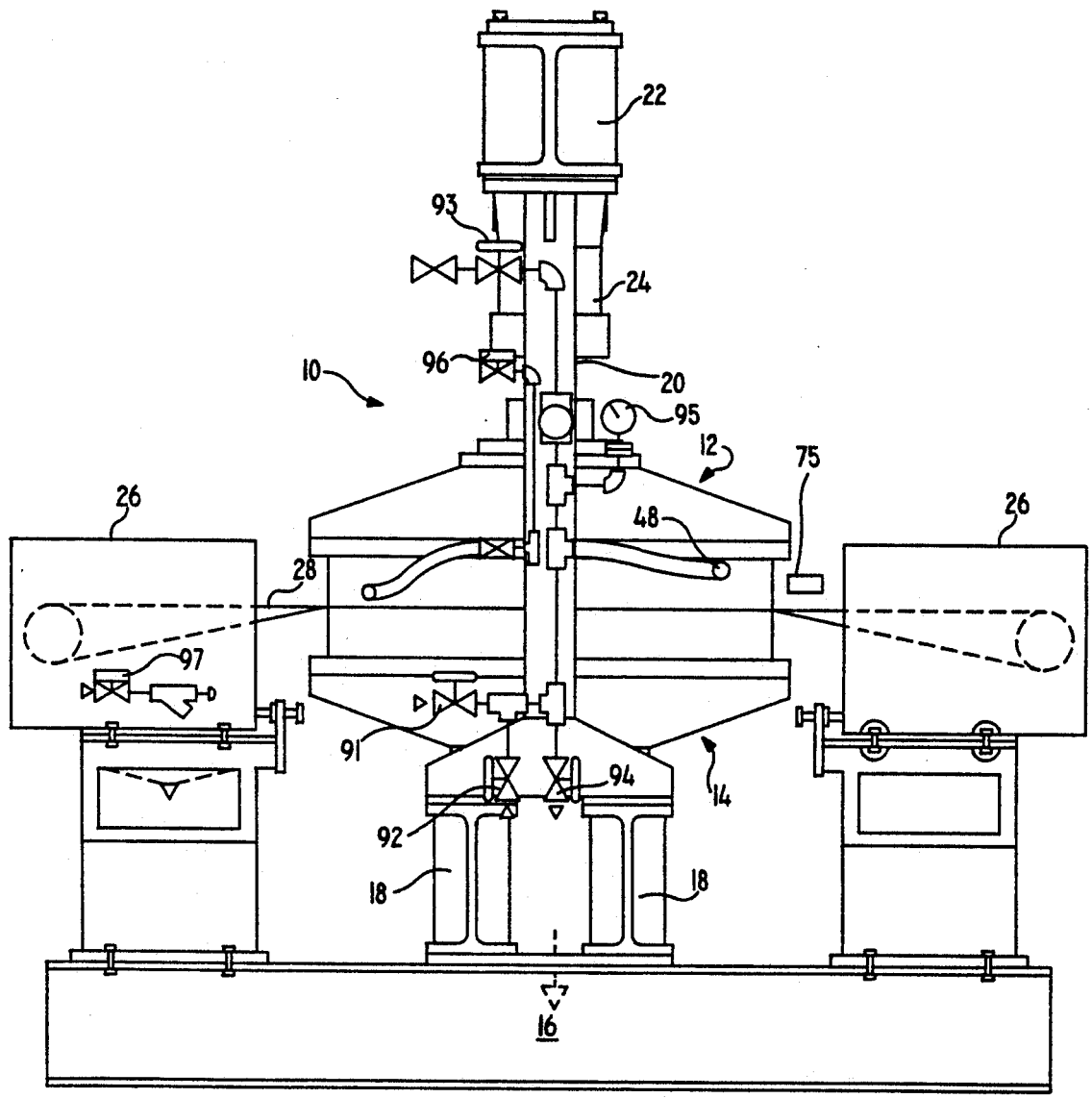
FIG. 2 is an elevational view showing the apparatus of the present invention with the plates of the filter in closed position and showing, schematically, the valve and piping system for fluids, liquids and gasses to the apparatus.

FIG. 2 illustrates the assembled filter apparatus of the present invention with the plate members closed and the filter belt 28 between the upper plate 12 and the lower plate 14. The hydraulic jack mechanism has been operated to force the plates together at a force at least exceeding the force created by the pressurized fluid with the belt filter medium in between the plates to seal the filter chamber that is created between the closed plates.

It should be uthe upper and lower mating faces of the upper plate member 12, the upper and lower mating faces of the lower plate member 14 and the mating faces of the lower strongback 18 be horizontal and parallel. The tension columns 20 and the centerline of the upper plate 12 and lower plate 14 should be vertical and parallel to each other and perpendicular to the the horizontal members. With care in the leveling and truing of these elements the plate members will engage each other and produce a good seal as they are closed, as well as align operating forces to their most effective use with a minimum of operating stress.

Figure 4:
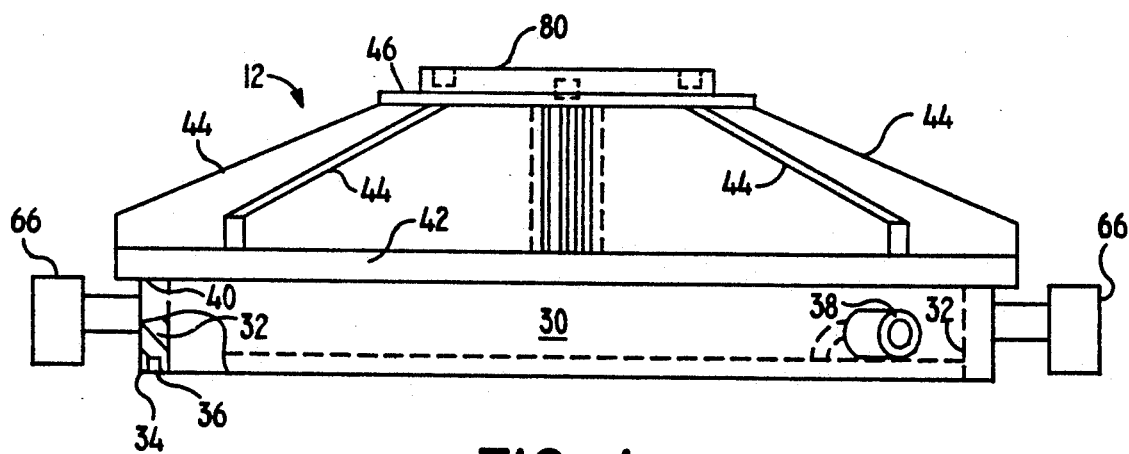
FIG. 4 is a side elevational view in partial section of the upper plate of the apparatus.
Figure 5:
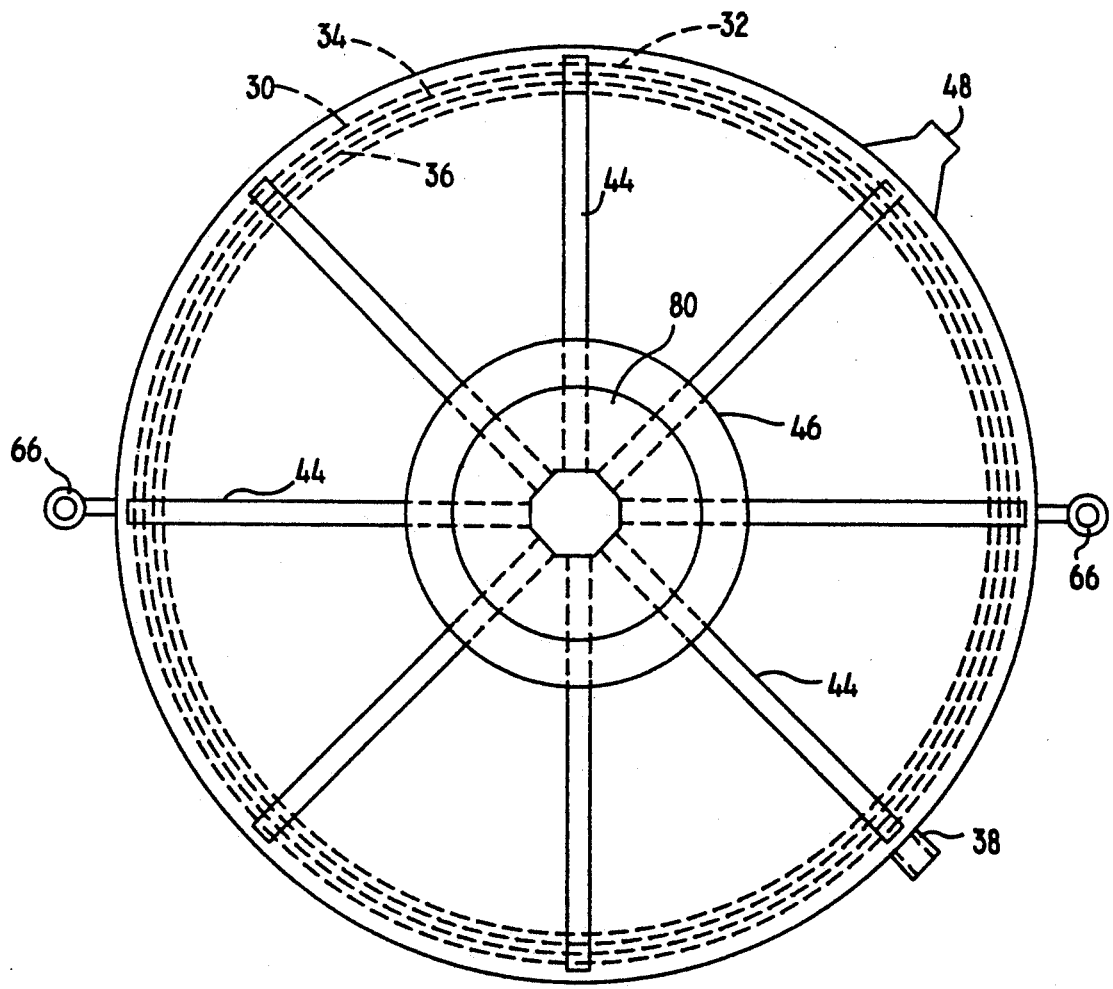
FIG. 5 is a top plan view of the upper plate of the apparatus.

Referring now to FIGS. 4 and 5 illustrating details of the construction of the upper plate member 12, the plate member comprises a cylindrical member 30 presenting an interior chamber area between the sidewall portions 32. The lower face 34 of the sidewall 32 of the wall member 30 has a recessed groove 36 around the entire periphery of the wall member. An external connection 38 connected to the recessed groove 36 is adapted to provide for pressurizing the groove as will be explained later. The upper face 40 of the sidewall is capped with a cap plate 42 and the plate supports a plurality of bracing ribs 44 for distributing forces from an upper jack plate assembly 46 to the sidewall portions of the plate member 12. The jack plate assembly is adapted to be engaged by and moved by the hydraulic jack 24. An entry port 48 passes through the entire sidewall 32 to permit the entry of fluids and gasses into the interior chamber area.

It should be understood that the upper plate member 12 is adapted to be raised and lowered within the frame assembly and that the lower face 34 of the sidewall 32 will be machined and ground to as true a surface as possible within machining tolerances.

Figure 7:
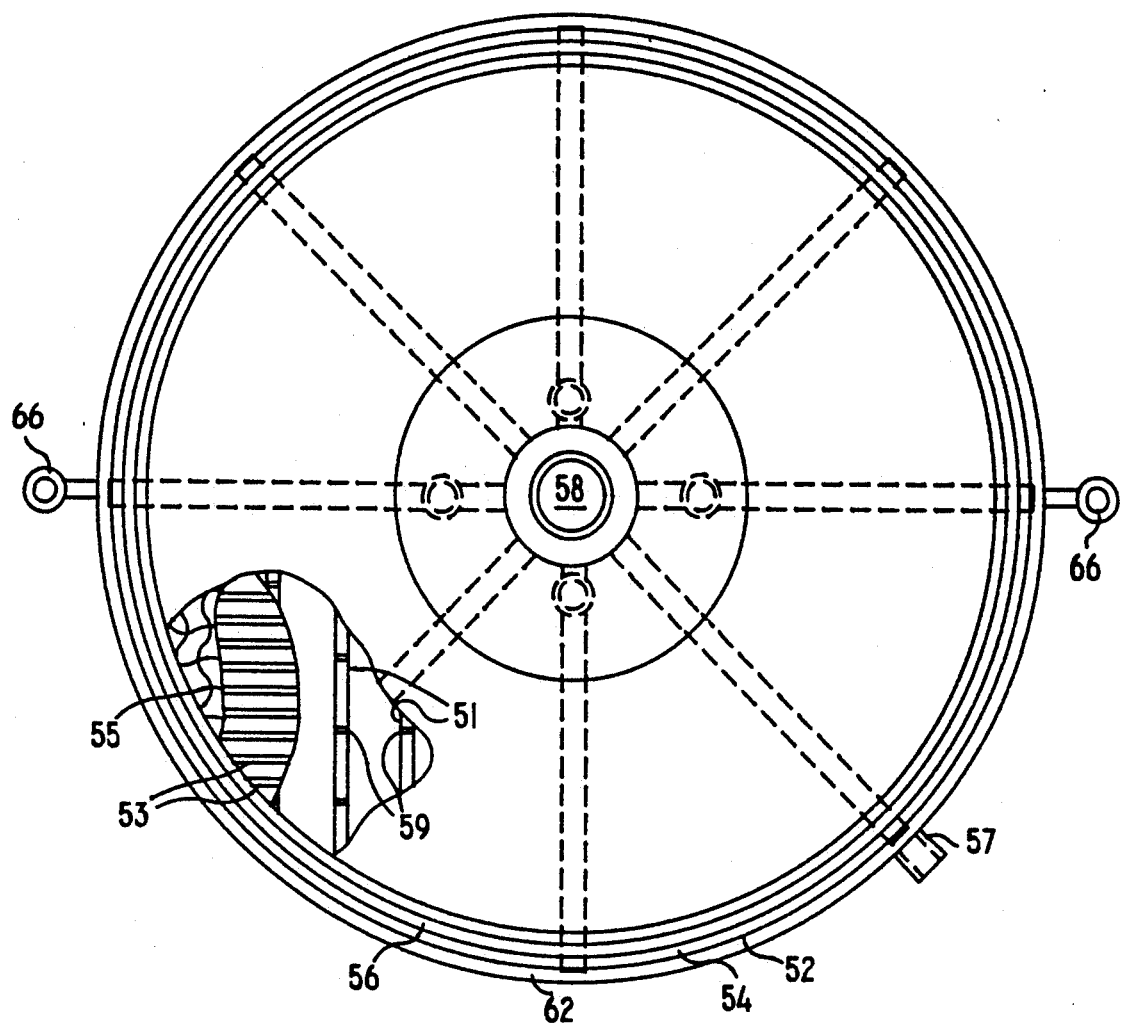
FIG. 7 is a top plan view in partial section of the lower plate of the apparatus.
Figure 6:
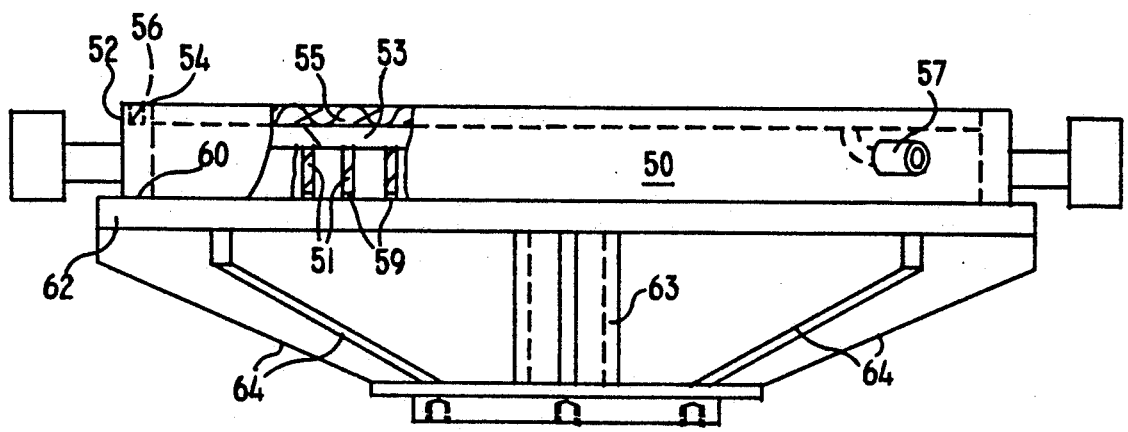
FIG. 6 is a side elevational view in partial section of the lower plate of the apparatus.

Referring now to FIGS. 6 and 7 illustrating details of construction of the lower plate member 14, the plate member comprises a cylindrical wall member 50 presenting an interior chamber area between the sidewall portions 52. The upper face 54 of the sidewall 52 has a recessed groove 56 around the entire periphery of the wall member. An external connection 57 connected to the recessed groove 56 is adapted to provide for pressurizing the groove as will be explained later. A central exit port 58 allows for exit of fluids from the interior chamber as will be explained later. The lower face 60 of the sidewall is capped with a base plate 62 and that plate supports a central column 63 and bracing ribs 64 for distributing forces from the lower plate assembly 14 to the lower strongback 18.

It should be understood that the lower plate member 14 is adapted to be stationary and to mate with the upper plate member 12 when that plate is lowered into position to close the filter chamber. The upper face 54 of the sidewall 52 will be machined and ground to as true a surface as possible within machining tolerances.

The grate assembly comprises a first set of spaced, horizontal bars 51 supported on the inside face of the lower plate 62, a second set of more closely spaced, horizontal bars 53 perpendicular to and supported on bars 51, and a woven wire screen 55 supported on the second set of bars 53. Both sets of horizontal bars 51 and 53 include a perimeter wall to hold the bars together. The base of bars 51 are notched at 59 to provide a plurality of passages for fluids to the exit port 58. The upper surface of the woven wire screen is substantially aligned with the finished surface of the upper face 54 of sidewall 52 and provide support for the filter medium 28 when in use. The grate assembly within the chamber area of the lower plate member may be of substantially any construction that will provide uniform support for the belt filter medium that will be positioned between the plate members when they are mated and closed with each other.

Figure 3:
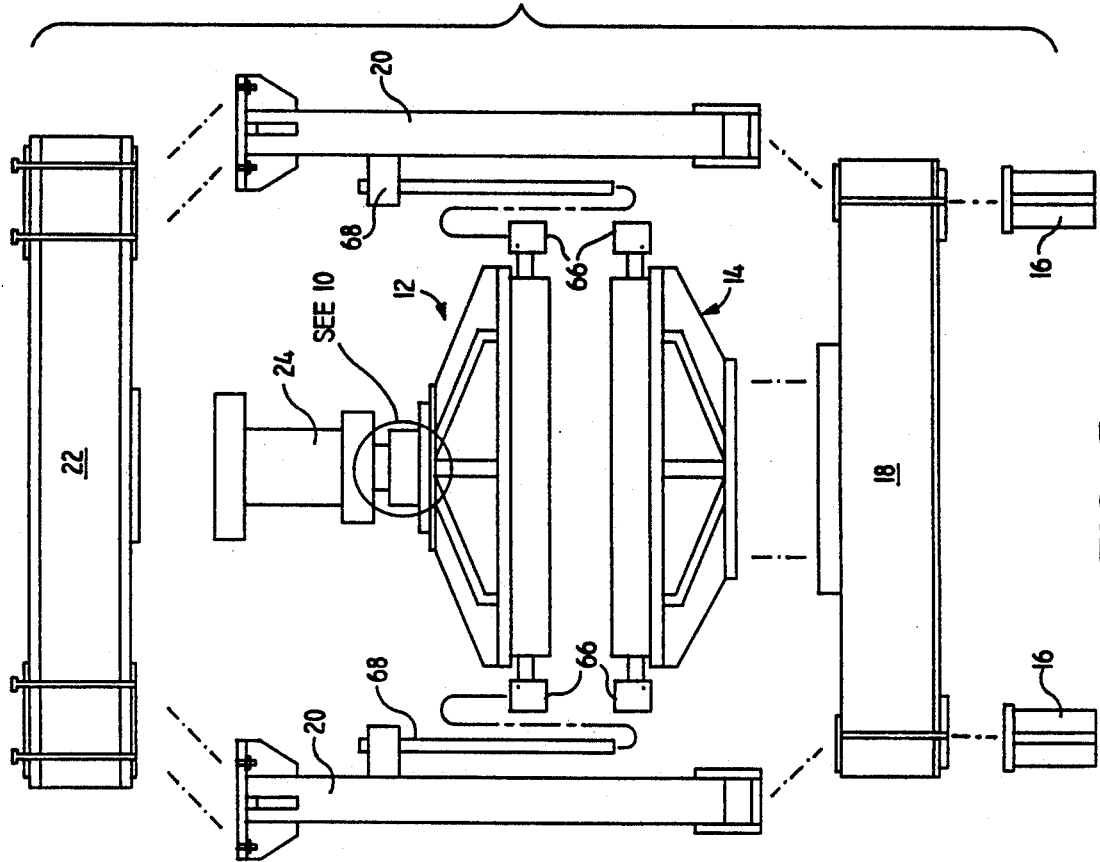
FIG. 3 is an exploded side elevational view of the structural elements of the present invention.

Both the upper plate member 12 and the lower plate member 14 are provided with external plate guides at 66 which are hollow tubular in form for cooperation with guide rods 68 mounted on the tension columns as shown in FIG. 3. The guide rods 68 are aligned to enter through the hollow tube of the plate guides 66 to permit the sensing of the alignment of the plates as they are closed. An alternative construction for the plate guides is the mounting of the guide rods on the lower plate member 14 and the mounting of the hollow tubular member on the upper plate member 12.

Figure 8:
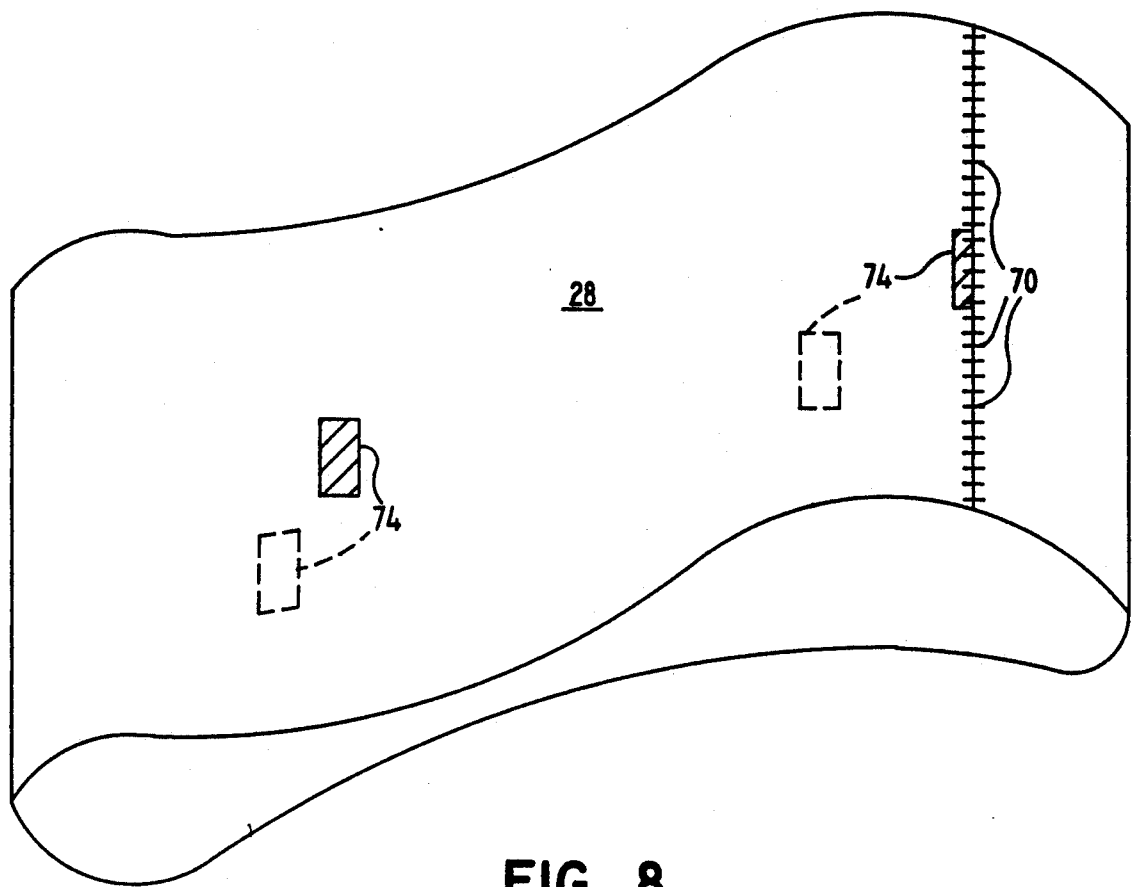
FIG. 8 is a perspective view of the filter medium belt as used in the present invention.
Figure 9:
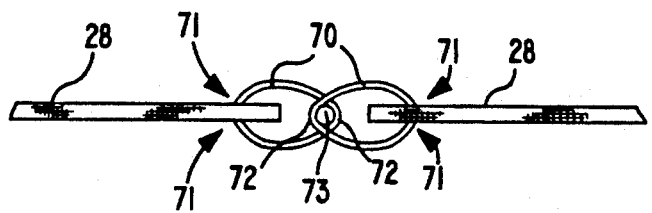
FIG. 9 is a partial sectional view showing the filter belt splice.

FIG. 8 illustrates the form of a continuous belt filter medium 28 that may be used with the apparatus of the present invention. With the continuous belt a double layer of filter medium is created within the filter chamber. It should be understood that the belt need not be continuous and need not be reuseable; that is, the belt may be an elongated rolled or folded belt that will be passed between the plates when they are opened and closed between the plates when they are closed and the belt may be discarded with the filter cake. In the endless belt form 28 as shown in FIG. 8, the belt is formed to be joined at a splice area as shown in FIG. 9 where each end of the belt is finished with meshed hooks 70 that hook onto the belt at 71 and have a loop end at 72 that is adapted to align with the loop end of the meshed hooks of the other end of the belt. A joining pin or bar 73 fits within the loop ends 72 to form the continuous belt. The continuous belt form 28 is provided with an elastomer embedded detectable marker 74. The detectable marker in the elastomer is of a form that can be sensed by a device such as a proximity switch and the detecting of the marker can be used to control the movement of the belt filter. As illustrated in FIG. 1 a proximity detector 75 is mounted adjacent to the belt drive assembly 26 in a spot to permit the belt to be advanced to introduce a clean filter medium between the plate members. With a proximity detector in the belt travel path, the belt can be centered within the filter chamber with proper control of the belt drive mechanisms. Alternative forms of locating and positioning means for the belt medium may include tabs on the belt and whisker switches for detecting the tabs.

FIG. 1 also illustrates adjustment means for lateral positioning of the assemblies 26 at both the feed and wash portions. At each assembly a station adjustment device 76 is fixed to the support frame for the feed or wash assembly 26 with adjustable means for moving the assembly toward or away from the filter apparatus and for proper tensioning of the filter belt.

Figure 10:
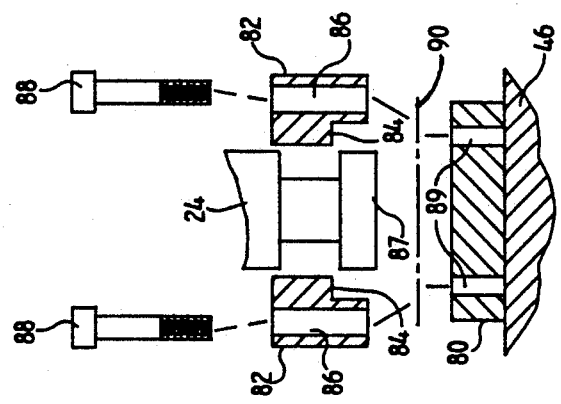
FIG. 10 is an exploded partial sectional view showing a stress concentration area and means for distributing stress in that area.

FIG. 10 illustrates in an exploded sectional view one form of assembly for coupling the upper plate 12 to the moving portion of the hydraulic jack 24. As here illustrated, a jack coupling plate 80 is attached, as by being welded, to the upper plate assembly 46. A pair of jack coupling members 82 with an inwardly directed dog 84 and hollow bore 86. The dogs 84 are adapted to cooperate with a shouldered end 87 of the hydraulic jack mechanism. Bolts 88 pass through the hollow bore and thread into a bolt hole 89 in the jack coupling plate 80. A shim 90 is positioned between the jack coupling plate 80 and the jack coupling 82 to provide for adjustment of the travel and alignment of the upper plate as well as to distribute the concentration of forces resulting from the closing of plates with hydraulic force.

FIG. 2 illustrates schematically the flow paths and valves for operating the filter apparatus of the present invention. Considering first the filtering procedure that is accomplished with the apparatus, the upper plate 12 and lower plate 14 initially are separated and the belt filter medium is resting on the upper surface and grate assembly of the lower plate member 14. When the apparatus is prepared to begin a filtering operation, the upper plate 12 is lowered into contact with the lower plate 14, the seal grooves 36 and 56 are pressurized (or evacuated) through external connection 38 and 57 to produce a good seal between the plates and the slurry to be filtered is entered through entry port 48. The plates are then pressed against each other and the slurry enters the chamber. The chamber of the mated filter plates is then subjected to a prescribed program of washes and air or gas pressures to force the liquids out of the slurry and to retain the solids as a cake on the belt filter medium. The assembly is then opened and the belt is advanced to a wash and dump station where the filter cake is removed from the belt and another portion of the belt is advanced onto the face of the lower plate member. As illustrated in FIG. 2, a slurry supply valve is shown at 91 and connected to the entry port 48 by suitable piping. Also connected to that same piping is a wash water valve 92 through which may be supplied wash or other liquids for entry into the filter chamber through the entry port 48. That same piping is adapted to supply blowdown air through valve 93 and to permit venting and draining of the piping through valve 94. Also associated with that piping is a pressure gauge 95 for showing the pressure within the filter chamber. A second set of piping connects a seal air valve 96 to the connections 38 and 57 to the recessed grooves 36 and 56, respectively, in the upper and lower plate member sidewall faces. At the wash station (shown at the left in FIG. 2) belt wash fluid is supplied through valve 97. It should be understood that a programmable controller may be adapted to control each of the movements and the valve openings in the proper sequence to accomplish the desired filtration of a slurry fluid.

The apparatus of the present invention may be controlled from a central control panel, not shown, either manually or by operation of a suitable programmable computer that can be programed for sequence and times of operations. Typical method step operations for the apparatus of the present invention include:

Step 1. With the filter plates fully open and with a clean filter belt in the filter area, the filter plates are closed under pressure to form the filter chamber.

Step 2. When the filter plates are closed with sufficient hydraulic jack pressure to keep the plates closed during a filtration cycle, the slurry supply valve opens feeding slurry into the filter chamber. At the same time the seal air valve opens to supply seal air to the plate mating surfaces at the recessed grooves. After a preset slurry fill time is completed, the slurry valve closes.

Step 3. With hydraulic jack pressure maintained and slurry fill time completed, the slurry wash valve opens allowing wash water to enter the filter chamber to remove solubles from the slurry. After a preset wash period is completed, the wash valve closes.

Step 4. With hydraulic jack pressure maintained, slurry wash time completed and sufficient compressed air pressure applied to dewater and dry slurry solids, the blowdown valve opens introducing compressed air into the filter chamber to dewater the washed slurry and dry the accumulated solids. After a preset time the blowdown valve closes and the seal air valve from Step 2 closes. The header drain valve then opens draining the filter inlet header and venting the filter chamber. After a preset time the header drain valve closes, but leaves enough residual pressure to push the filter cake onto the belt.

Step 5. After blowdown time is completed and the header drain valve open time is completed, the filter plates are opened exposing the accumulated solids filter cake.

Step 6. After the plates have fully opened the filter belt drive mechanism advances the filter belt to discharge the filter cake onto a conveyor belt or bin and to position a clean filter medium for the next filtration cycle.

The apparatus of the present invention is adapted to a variety of slurry treatments that can produce a desired condition in the filtrate from the slurry or in the filter cake solids. The slurry fluid when it is placed into the filter chamber between the closed filter plates may be initially subjected to a pressure squeeze of air or gas to force free liquid from the slurry. Because of the construction and the sealing of the sidewall faces of the plates, the chamber may be subjected to elevated pressures adapted for each slurry that is encountered. With the slurry pumped into the chamber under pressure and with the initial application of air or gas pressure to the filter chamber an even deposit of the slurry fluid throughout the chamber is insured. The pressure of the air or gas squeeze is optimized to exceed the forces binding the liquids onto the slurry solids in the interstices of the slurry filter cake. The squeeze air or gas pressure can be reduced in time as the filtering process proceeds based on the detected pressure within the chamber. From the foregoing statement of Poiseuille's Law, it can be seen that for the application to the present invention, the pressure applied to the filtering operation may be reduced as the capillaries through the filter cake become opened. With the proper control of the pressure squeeze a substantially solid, dry filter cake is produced.

An additional feature of the present invention is the application of a low pressure differential into the chamber of the upper filter plate and above the filter cake as the filter plates are separated. The application of this low pressure, and (if necessary) a slight taper of the inner wall of the upper chamber, insures that the filter cake will be forced out of the chamber and onto the belt filter medium rather than be stuck in the chamber. When the cake is removed from the chamber, the belt may be advanced to the disposal station and to the wash station as a new, cleaned belt filter medium is moved into position between the filter plates. The removal of the filter cake from the chamber may also be assisted by vibration of the upper filter plate as it is moved away from the lower plate.

The apparatus and piping of the present invention also permits the use of treatment liquids or gasses in the filtration process. For example, the initial gas entered into the chamber after the slurry fluid has been placed can be adapted to prevent the existence of an explosive atmosphere or to create an inert or nonhazardous condition within the chamber. The initial wash may be with a solvent for a solid or a liquid existing in the slurry fluid so as to extract the solid or liquid before or while the filter cake is being formed.

The apparatus of the present invention is particularly adapted to the treatment of slurries produced in geothermal energy sources. Those slurries frequently contain toxic materials and are at elevated temperature. Further, the filtrate extracted from the slurry is needed as an injection fluid to assist in the continued production of geothermal energy from the source. With the apparatus of the present invention, the filtrate extracted from the slurry is available for reinjection into the geothermal source and the filter cake is washed and substantially dried so to reduce the requirements for further treatment before disposal.

The range of pressures that may be used with the present apparatus in the extraction of fluids from the slurry materials includes pressures from about 50 PSI to about 350 PSI. The pressure used to force the filter cake from the upper plate can be a pressure up to 5 PSI. The pressure applied to the recessed grooves in the peripheral sidewalls of the upper and lower plate members should be a difference in pressure of up to about 30 PSI with either recessed groove having a higher pressure than the other and the pressures in the grooves may range from 0 or vacuum to 125 PSI and also 15 PSI to 30 PSI different from the pressure within the slurry chamber.

The force applied by the hydraulic jack is of the order of 275,000 pounds on the faces of the plates so as to create a pressure at the filter plate faces exceeding the pressurized chamber separating forces. The separating force at the faces is the pressure within the chamber times the area of the chamber. The face pressure should be about 10% higher than the separating forces.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:

1. A filter apparatus for pressure filtering fluid slurry materials containing liquid and solid materials in a filter chamber and for creating a substantially dry filter cake of said solid materials, said apparatus having mechanical means for opening and closing said filter chamber and for maintaining said chamber closed and under pressure during filtering operations and for opening said chamber after filtering has been completed, said apparatus comprising:

means establishing said filter chamber, said means including an upper plate member and a lower plate member, said upper and lower plate members having recessed portions and peripheral sidewalls defining respective chamber areas, said upper and lower plates being relatively movable toward and away from each other to engage said peripheral sidewalls of said upper and lower plate members under pressure and to form said filter chamber by mating said recessed portions, guide means on at least one of said upper and lower plates and alignment guide rod means cooperating with said guide means during said relative movement between said upper and lower plate members to sense alignment and engagement of said peripheral sidewalls, mechanical means for producing relative movement of said upper and lower plate members with respect to each other to engage and separate said peripheral sidewalls to form said filter chamber and for maintaining a mechanical pressure engagement of said peripheral walls when said peripheral walls are engaged, said mechanical means causing cooperating operation of said guide means and said alignment guide rod means during said relative movement of said upper and lower plate members, entry port means into said upper plate member for passage of fluid material including said fluid slurry material into said recessed portion of said upper plate member, exit port means from said lower plate member for passage of fluid materials from said recessed portion of said lower plate member, a grate member within said recessed portion of said lower plate member, a porous belt filter medium positioned between said upper and lower plate members and contacting said grate within said lower plate member, said belt filter medium having lateral dimensions at least as large as the largest lateral dimensions of said peripheral sidewalls of said upper and lower plate members, said belt filter medium being positioned and aligned to be pressed between said pressure engaged sidewalls of said upper and lower plate members and on said grate when said upper and lower plates mate to form said filter chamber, belt drive means for positioning and removing said belt filter medium from between said upper and lower plate members when said upper and lower plates are separated, said belt drive means including sensing means positioned with respect to said filter chamber for sensing the position of said belt filter medium with respect to said upper and lower plate members and for controlling operation of said belt drive means, means for passing fluids including said fluid slurry material into said entry port means of said upper plate member, and control means a) for controlling said belt drive means, b) for controlling said mechanical means for producing relative movement of said upper and lower plate members, c) for maintaining said mechanical engagement of said upper and lower plate members under pressure, and d) for controlling passing of fluids including said fluid slurry material into said entry port means, whereby fluids from said fluid slurry material entering said entry port means are passed through said chamber and said belt filter medium and exit through said exit port means while solids in said fluid slurry material are retained in said chamber on said belt filter medium until said upper and lower plate members are separated, said solids being formed as a substantially dry filter cake and being removed from said chamber with said belt filter medium after said plate members are separated, and said substantially dry filter cake is removed from said belt filter medium after said belt filter medium is removed from between said upper and lower plate members.

2. The apparatus of claim 1 wherein said plate members have a cylindrical cross-section.

3. The apparatus of claim 1 wherein said plate members have identical lateral cross-section.

4. The filter apparatus of claim 1 wherein said peripheral sidewalls of both said upper and lower plate members have lateral wall portions extending along the entire sidewalls and defining mating surfaces of said sidewalls, and said lateral wall portions of both said upper and lower plate members having an open groove extending along the entire lateral wall portions, said open grooves in said upper and lower plate members being aligned to mate when said sidewalls of said upper and lower plate members are engaged to form said filter chamber, said filter belt medium being between said upper and lower plate members and across said open grooves when said upper and lower plate members are mated.

5. The filter apparatus of claim 4 wherein said belt filter medium is a continuous belt, said belt drive means for positioning and removing said belt filter medium including a pair of rollers positioned outside the sidewalls of said upper and lower plate members, one of said pair of rollers being on each side of said upper and lower plate members and said rollers being aligned with respect to each other and said filter chamber so as to align said belt filter medium to fit laterally between said upper and lower plate members and to cover the entire mating surfaces of said sidewalls and grooved walls, said continuous belt filter medium producing a double layer of said filter belt means when said upper and lower plate members are mated to form said filter chamber.

6. The filter apparatus of claim 5 wherein said continuous belt filter medium contains a plurality of detectable marking means along the length of said belt, said plurality of marking means being separated by a distance larger than said largest lateral dimension of said peripheral sidewalls of said plate members, and said marking means cooperating with said sensing means of said belt drive means for controlling operation of said belt drive means.

7. The continuous belt filter medium of claim 6 wherein said detectable marking means are iron particles suspended in an elastomer, and said sensing means is a means for detecting said detectable marking means and for controlling operation of said belt drive means.

8. The filter apparatus of claim 4 wherein said sidewalls of said upper and lower plate members include separate fluid passage means for connecting separate fluid supply sources to said grooves.

9. The filter apparatus of claim 1 including a belt filter medium wash chamber exterior of said upper and lower plate members, said wash chamber including means for removing retained solids materials of said fluid slurry materials remaining on said belt filter medium after said belt filter medium has moved through said filter chamber.

10. The filter apparatus of claim 1 including means for connecting said entry port into said upper plate member consecutively a) to fluid slurry materials to fill said filter chamber when said peripheral walls are engaged, b) to pressurized fluids applied so as to force liquid materials out of said fluid slurry materials and through said belt filter medium, and c) to pressurized fluid as said upper and lower plate members are separated to force said substantially dry filter cake retained in said filter chamber out of said filter chamber and onto said belt filter medium.

11. The filter apparatus of claim 10 with the addition of means for connecting said entry port in said upper plate member to a source of pressurized wash fluids after said fluid slurry materials fill said filter chamber and before connection of said pressurized fluids.

12. The filter apparatus of claim 10 wherein said means for connecting said pressurized fluid applied during separation of fluids from said fluid slurry materials including means for connecting a gas at a pressure of about 50 to 350 PSI.

13. The filter apparatus of claim 10 wherein said means for connecting said pressurized fluids include means for connecting a gas at a pressure that is varied during the separation of fluids from said slurry fluid.

14. The filter apparatus of claim 10 wherein said means for connecting said pressurized fluids include means for connecting an inert gas.

15. The filter apparatus of claim 10 wherein said control means includes means for controlling the application of said fluids and said fluid pressures to said entry port.

16. The apparatus of claim 1 with the addition of means for vibrating said upper plate member as said plate members are separated to assist in forcing said substantially dry filter cake from said upper plate member and onto said belt filter medium.

17. A method for separating solid materials from liquid materials in a fluid slurry material employing a filter apparatus having separable chamber plate members with mating peripheral sidewalls and a belt filter medium positionable between said chamber plate members at said peripheral sidewalls and within said chamber created by said chamber plate members, said sidewalls having internal grooves along their mating perimeter faces, said internal grooves being adapted to be separately pressurized, the steps comprising:

a) positioning said belt filter medium within said chamber plate members and between said perimeter faces, guiding said chamber plate members to align said internal grooves in said mating perimeter faces, and closing said plate members against each other under pressure to seal said chamber and said internal grooves in said perimeter faces, b) applying a pressurized gas to said internal grooves of said sidewalls so as to create a differential pressure between the groove in one of said separable chamber plate members with respect to the pressure in the groove of the other of said separable plate members, c) filling said chamber with said fluid slurry material, d) interrupting said filling with said fluid slurry material and applying a pressurized fluid to said filter chamber while said fluid slurry material is in said chamber to force fluids from said fluid slurry material while retaining solid materials of said fluid slurry material within said chamber and on said belt filter medium, e) removing said pressurized gas from said sidewall internal grooves and removing said pressurized fluid from said filter chamber, and separating said chamber plate members to open said filter chamber, f) moving said belt filter medium from between said separated filter plate members to remove said retained solid materials from said filter apparatus, removing said retained solid materials from said belt filter medium, and g) repeating steps a) through f).

18. The method of claim 17 with the addition step of interrupting said filling with said fluid slurry material and applying a wash fluid to said chamber to wash fluids from said fluid slurry material through said belt filter medium while retaining solids materials of said fluid slurry materials within said chamber on said belt filter medium, and then applying said pressurized gas to said filter chamber to force said wash fluid from said fluid slurry materials.

19. The method of claim 17 with the additional step of applying a pressurized gas to said filter chamber between said steps of filling said chamber with said fluid slurry materials and applying wash fluid to said chamber.

20. The method of claim 17 with the additional step of introducing a fluid material to said chamber after said fluid slurry material has been introduced to render said chamber contents inert.

21. The method of claim 17 with the additional step of introducing a fluid material to said chamber after said fluid slurry material has been introduced and while said fluid slurry material is in said chamber for soluble extraction of materials from said fluid slurry material and said retained solid materials.

22. The method of claim 20 wherein a fluid material is introduced in said chamber while said slurry material is in said chamber to extract oil from said slurry to render said retained slurry solids as non-hazardous.

23. The method of claim 17 with the additional step of introducing a fluid material to said chamber after said fluid slurry materials has been introduced to render the fluids extracted from said fluid slurry materials non-hazardous.

24. The method of claim 17 wherein said pressurized fluid applied to said filter chamber is a fluid material selected to extract desired liquid from said fluid slurry material while retaining undesired solid materials on said belt filter medium.

25. The method of claim 17 wherein said pressurized fluid applied to said filter chamber is a fluid material selected to extract undesired liquids and solvent extractable undesired solid materials from said fluid slurry materials and from said retained solid materials while retaining desired solid materials on said belt filter medium.

26. A filter apparatus for pressure filtering fluid slurry materials containing liquid and solid materials in a filter chamber and for creating a substantially dry filter cake of said solid materials, said apparatus having mechanical means for opening and closing said filter chamber and for maintaining said chamber closed and under pressure during filtering operations and for opening said chamber after filtering has been completed, said apparatus comprising:

A) means establishing said filter chamber, said means including
  a) a support frame including:
    i) a lower strongback member,
    ii) upright tension columns joined to said lower strongback member,
    iii) an upper strongback member joined to said tension columns,
    iv) said lower strongback member, tension columns and upper strongback member creating an open interior portion within said support frame
  b) an upper plate member operatively attached to said upper strongback member,
  c) a lower plate member operatively attached to said lower strongback member,
  d) said upper and lower plate members having recessed portions and peripheral sidewalls defining respective chamber areas,
  e) a mechanical drive means for producing relative movement of said upper plate member with respect to said upper strongback member,
  f) said relative movement of said upper plate member with respect to said upper strongback causing said peripheral sidewalls of said upper and lower plate members to become mated under pressure and to form said filter chamber by mating said recessed portions,
  g) guide means on at least one of said upper and lower plate and alignment guide rod means on said upright tension columns cooperating with said guide means during said relative movement between said upper and lower plate members to sense alignment and engagement of said peripheral sidewalls, B) entry port means into said upper plate member for passage of fluid material including said fluid slurry material into said recessed portion of said upper plate member, C) exit port means from said lower plate member for passage of fluid materials from said recessed portion of said lower plate member, E) a grate member within said recessed portion of said lower plate member, F) a porous belt filter medium positioned between said upper and lower plate members within said open interior portion and contacting said grate within said open interior portion and contacting said grate within said lower plate member, said belt filter medium having lateral dimensions at least as large as the largest lateral dimensions of said peripheral sidewalls of said upper and lower plate members, said belt filter medium being positioned and aligned to be pressed between said pressure engaged sidewalls of said upper and lower plate members and on said grate when said upper and lower plates mate to form said filter chamber, G) belt drive means for positioning and removing said belt filter medium from between said upper and lower plate members through said open interior portion when said upper and lower plates are separated, H) means for passing fluids including said fluid slurry material into said entry port means of said upper plate member, I) and control means
   a) for controlling said belt drive means,
   b) for controlling said mechanical means for producing relative movement of said upper plate member with respect to said upper strongback member,
   c) for maintaining said mechanical engagement of said upper and lower plate members under pressure, and
   d) for controlling passing of fluids including said fluid slurry material into said entry port means, whereby fluids from said fluid slurry material entering said entry port means are passed through said chamber and said belt filter medium and exit through said exit port means while solids in said fluid slurry material are retained in said chamber on said belt filter medium until said upper and lower plate members are separated, said solids being formed as a substantially dry filter cake and being removed from said chamber with said belt filter medium after said plate members are separated, and said substantially dry filter cake being removed from said belt filter medium after said belt filter medium is removed from between said upper and lower plate members.

27. The filter apparatus of claim 26 with the addition of sensing means positioned with respect to said filter chamber, said sensing means being adapted for detecting the position of said belt filter medium with respect to said filter chamber, said sensing means further being adapted to control said belt drive means for said belt filter medium to control movement and alignment of said belt filter medium when said upper and lower plate members are separated and for positioning said belt filter medium between said plate members before said relative movement of said upper plate member to engage said peripheral sidewalls of said upper and lower plate members.

* * * * *